(Model.)
L. FRITZ.
JACKETED VESSEL.
No. 288,990. Patented Nov. 27, 1883.
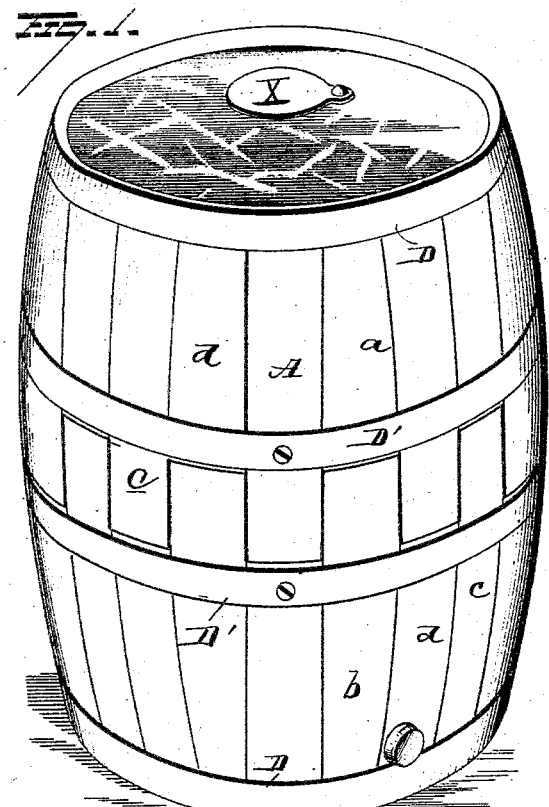
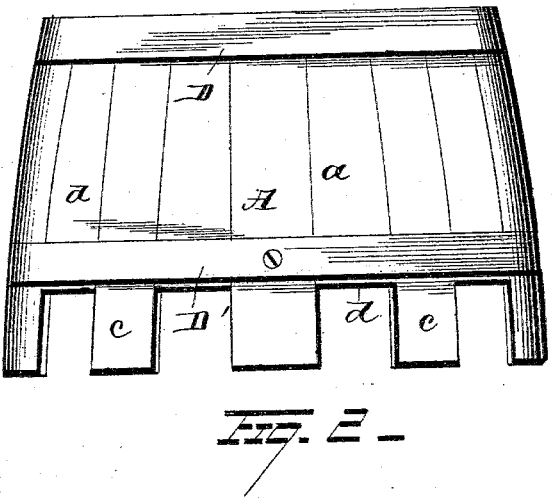
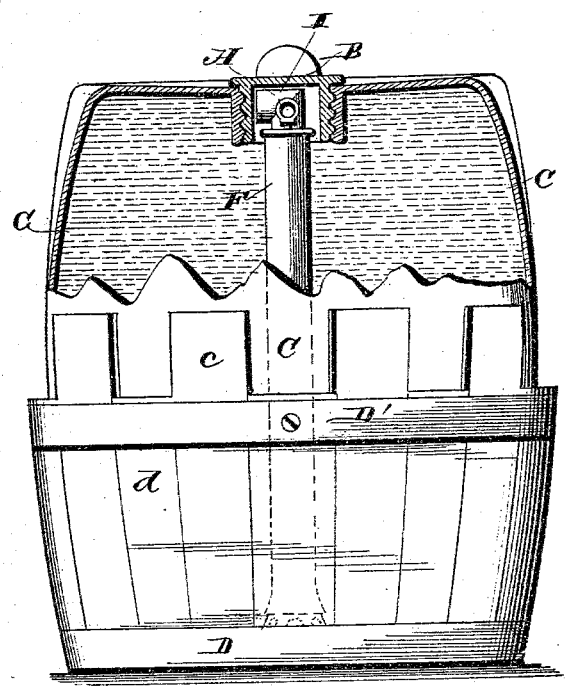
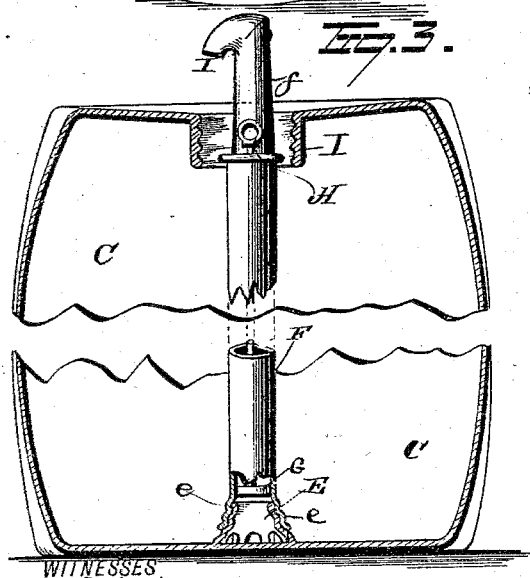
WITNESSES
INVENTOR
Louis Fritz
Attorney

UNITED STATES PATENT OFFICE.

LOUIS FRITZ, OF MEMPHIS, TENNESSEE.

JACKETED VESSEL.

SPECIFICATION forming part of Letters Patent No. 288,990, dated November 27, 1883.

Application filed September 27, 1883. (Model.)

*To all whom it may concern:*

Be it known that I, LOUIS FRITZ, of Memphis, in the county of Shelby and State of Tennessee, have invented certain new and useful Improvements in Storing-Vessels; and I do hereby declare the following to be a full, clear, and exact description of the invention, such as will enable others skilled in the art to which it appertains to make and use the same.

My invention relates to an improvement in jacketed vessels, the object of the same being first to provide a separable jacket adapted to protect the inner barrel during transportation, and also adapted to be easily removed therefrom for return-shipment when necessary. A further object is to provide my improved storing-vessel with a pump which can be lengthened when it is desired to draw off the contents of the barrel, or shortened, so as to rest within and be completely protected by the barrel when necessary; and with these ends in view my invention consists in the parts and combinations of parts as will be more fully described, and pointed out in the claims.

In the accompanying drawings, Figure 1 is a perspective view of my improved storing-vessel ready for transportion. Fig. 2 is a similar view, showing the jacket partly detached from the barrel; and Fig. 3 is a view in longitudinal section of the barrel, showing the pump therein.

A designates the sectional jacket, made of wood, and provided at one end with an opening, X, through the head, to enable the screw-cap B of the vessel C to be removed when necessary. The jacket A is made up of the sections $a\ b$, each of which is provided with a head, the head and staves of each part being held securely together by the hoops D D'. The outer hoops, D, are rigidly secured to the staves, so as to be immovable thereon, while the inner ones, D', are secured to the staves by one or more screws, which latter can be removed when it is desired to separate the sections $a\ b$. Each section is made up of the short staves $c\ d$, the staves $c$ being slightly longer than the staves $d$, and arranged on opposite sides of the short staves, as shown in the drawings. When the two sections $a$ and $b$ of the jacket A are put together, the long staves of one section come opposite the short staves of the outer section, forming a complete union and a perfect jacket, which protects the barrel from injury. While uniting and separating the sections $a\ b$, the hoops D' are moved outwardly toward the ends or heads of the jacket. This allows the staves of both sections to separate slightly, which separation is sufficient to enable the sections to be drawn apart. When it is desired to lock the sections together, the inner hoops, D, are brought toward the center and held by the screws before referred to. This firmly compresses together the staves of the sections and prevents the sections from being separated. By this means the jacket can be removed from the metallic vessel after reaching its destination, nested by putting one section within the other, and returned to the sender, thereby economizing space and considerably reducing the freight.

The vessel C is a complete barrel in itself, and one head is dished or made concave, and provided with an opening, through which the pump-spout is drawn for the purpose of drawing off the contents of the barrel. This head is dished or concaved, so as to direct the drip back into the opening, and during transportation this opening is closed in a water-tight manner by the screw-cap B, the rim of which rests against a rubber or other suitable gasket. The barrel C is made of sheet metal, the body of which is crimped longitudinally from the center outwardly toward both ends for the purpose of increasing the strength of the same, and also for the purpose of giving it the shape of a barrel without the necessity of seaming. The lower head can be made concave for the purpose of making it better able to resist the strain; but this is not absolutely necessary. The heads of the barrel are preferably flanged, and slip over the ends of the body, on the outside of it, and are there brazed or soldered.

E is a screw-threaded hollow standard, rigidly secured to the inner face of the lower head of the barrel, immediately below the opening in the upper head. The standard E is adapted to hold the pump F in position within the barrel, and is perforated around its lower edge to allow the liquid to enter the pump. The pump F is provided with a valved opening at its lower end, and with the female screw-threaded sleeve $e$, situated around the opening, by means of which the pump is secured to the standard E. This pump is provided with a valved plunger, G, and handle H, and with a spout, I, which latter projects up through the upper end of the pump-stock. The neck $f$ of this spout is made tapering, the lower end thereof being slightly larger than the upper end, and the opening in the pump-stock is slightly smaller than the lower end of the spout for the purpose of preventing the spout from being completely withdrawn. When it is desired to transport the barrel, the spout of the pump is forced down to its lowest position and the screw-cap B screwed in place. The upper projecting end of the spout then rests within the screw-threaded opening I in the head of the vessel below the screw-cap, and is completely protected thereby.

When it is desired to draw off the contents of the barrel, the screw-cap is removed, and the pump-spout drawn out as far as the opening in the neck of the pump-stock will admit and the handle worked in the ordinary manner. The wooden head of the jacket covering the upper end of the barrel rests considerably above the latter to prevent the screw-cap from being injured by striking against a projection.

My invention is simple in construction, is durable in use, and can be manufactured at a small initial cost.

Having fully described my invention, what I claim as new, and desire to secure by Letters Patent, is—

1. The combination, with a metallic bilged barrel, of a sectional or two-part bilged jacket removably secured around the same, substantially as set forth.

2. The combination, with a metallic bilged barrel, of a sectional or two-part jacket made up of staves of irregular lengths, and secured around the barrel, substantially as set forth.

3. The combination, with a crimped metallic barrel, of a jacket, A, composed of the sections $a\ b$ and the hoops D D', substantially as set forth.

4. The combination, with a vessel provided with the threaded standard E and the screw-cap B, of the pump, of less length than the vessel, and having a lower threaded end, and a spout adapted to be drawn up above the opening, substantially as set forth.

In testimony whereof I have signed this specification in the presence of two subscribing witnesses.

LOUIS FRITZ.

Witnesses:
GEO. F. DOWNING,
S. G. NOTTINGHAM.